(12) United States Patent
Ruottu

(10) Patent No.: US 6,276,441 B1
(45) Date of Patent: Aug. 21, 2001

(54) METHOD AND REGENERATOR FOR REGENERATIVE HEAT TRANSFER

(75) Inventor: Seppo Ruottu, Karhula (FI)

(73) Assignee: Neste OY, Espoo (FI)

( * ) Notice: Subject to any disclaimer, the term of this patent is extended or adjusted under 35 U.S.C. 154(b) by 0 days.

(21) Appl. No.: 08/700,087

(22) Filed: Aug. 20, 1996

Related U.S. Application Data

(63) Continuation of application No. 08/381,959, filed as application No. PCT/FI93/00387 on Oct. 2, 1992, now abandoned.

(30) Foreign Application Priority Data

Oct. 2, 1992 (FI) .................................................. 924438

(51) Int. Cl.[7] .................................................. F28D 13/00
(52) U.S. Cl. .................. 165/104.16; 422/142; 422/141; 422/196
(58) Field of Search .................. 165/104.16, 104.15; 422/196, 142, 141

(56) References Cited

U.S. PATENT DOCUMENTS

| | | | |
|---|---|---|---|
| 3,912,465 | * 10/1975 | Kunii et al. | 422/142 X |
| 4,307,773 | 12/1981 | Smith | 165/104.16 |
| 4,770,237 | * 9/1988 | Morin et al. | 165/104.16 |
| 4,896,717 | 1/1990 | Campbell, Jr. et al. | 165/104.16 |

FOREIGN PATENT DOCUMENTS

| | | |
|---|---|---|
| 6380280 | 5/1982 | (AU) . |
| 1500636 | 11/1967 | (FR) . |
| 1216774 | 12/1970 | (GB) . |
| 2085566 | 4/1982 | (GB) . |
| 2118702 | 11/1983 | (GB) . |
| 0842381 * | 7/1981 | (SU) .................. 165/104.16 |
| 8705687 | 9/1987 | (WO) . |

OTHER PUBLICATIONS

Abstract of Soviet Patent SU–638–834 (12/78) F28d–13 (2appl 10).
Abstract of Soviet Patent SU–805888 Moisenko, et al. Bul. 29 8/77 (3appl10).

* cited by examiner

*Primary Examiner*—Christopher Atkinson
(74) *Attorney, Agent, or Firm*—Birch, Stewart, Kolasch & Birch, LLP

(57) ABSTRACT

The present invention relates to a heat transferring device for transferring heat energy from a first gaseous flow into a second gaseous flow. The heat transferring device includes first and second circulating fluidized bed reactors. A first gaseous flow enters the first bed and carries heat transferring particles into a first cyclone. A second gaseous flow enters the second bed and carries heat transferring particles into a second cyclone. The particles accumulated at the bottom of the first cyclone, are presented with a recirculation channel to the first bed and a cross-over channel to the second bed. Likewise, the particles accumulated at the bottom of the second cyclone, are presented with a recirculation channel to the second bed and a cross-over channel to the first bed.

15 Claims, 1 Drawing Sheet

METHOD AND REGENERATOR FOR REGENERATIVE HEAT TRANSFER

This application is a continuation, of application Ser. No. 08/381,959 filed on Mar. 22, 1995, now abandoned, which is a 371 of PCT/FI93/00387 filed Oct. 2, 1992.

BACKGROUND OF THE INVENTION

1. Field of the Invention

The invention relates to a method of regenerative heat transfer from one flow to another based on the use of circulating fluidized bed reactors. The method can be employed to solve problems associated with conventional fixed-element, fixed-bed and fluidized-bed heat regenerators.

2. Description of the Related Art

Heat transfer from one flow to another is one of the basic unit processes in process and energy technology. Currently, heat transfer is implemented chiefly using two heat exchanger types called recuperative or regenerative according to their operating principle.

In recuperative heat exchangers, heat transfer takes place via a nonpermeable wall which isolates the flows from each other. In the basic type of a recuperative heat exchanger, thermal energy is conducted directly through the wall from one flow to another. A specific subgroup of recuperative heat exchangers is formed by the so-called intermediate circulation recuperators in which a heat transfer medium is recirculated between two recuperative heat exchangers. Such heat exchangers are employed in, e.g., nuclear power plants in which it is necessary to assure that the high-activity flow cannot mix with the secondary circulation in accident situations. Another exemplifying group of intermediate-circulation recuperators is formed by fluidized-bed boilers equipped with superheaters placed external to the combustion chamber; in these boilers the sand heated in the combustion chamber is cooled in a separate fluidized-bed superheater. The chief limitations of recuperative heat exchangers are related to the erosion, corrosion and temperature of the heat exchanger vessel wall materials. Today, no practical wall materials are available for conditions exhibiting high mechanical or chemical stresses.

The highest allowable temperature in recuperators is often limited by the strength properties of the wall material. Moreover, recuperators are expensive and restricted in their control possibilities. Good controllability can, however, be achieved in intermediate-circulation recuperators.

In regenerative heat exchangers, thermal energy is transferred by way of allowing the heated heat-transferring medium to release energy into a colder flow and then reheating the cooled heat-transferring medium in a hotter flow. Regenerative heat exchangers are further divided into cyclically and continuously operating types on the basis of their operating principle.

In cyclically operating regenerators the hotter and the cooler flow are cyclically routed via a single solid structure which thus alternatingly stores and releases thermal energy. The batch-heated rock stove of a sauna is without doubt the oldest application of the cyclically operated regenerator.

In continuously operating regenerators the heat-storing medium is continually recirculated from one flow to another. The best-known type of continuously operating regenerator is the Ljungström regenerator in which a rotating, cylindrically shaped heat exchanger disc transfers thermal energy from one material flow to another. This regenerator type has been modified for different applications such as, for example, the air-conditioning regenerator which additionally provides moisture transfer on surfaces coated with lithium chloride paste.

Besides the regenerator types of the above-described kinds with a fixed-shape, contiguous heat-transferring element, regenerators based on granular heat transfer media are known in the art.

Several different types of regenerators are known having the granular heat transfer medium in the fixed-bed state and the heat transfer medium is then mechanically recirculated between the layers of the bed.

German patent DE 3,225,838/A/employs a granulated heat transfer medium (e.g., porcelain pellets) for heat transfer between the gas flows. The granular bed material is fluidized, whereby the pellets remain clean and clogging of the heat exchanger is avoided. U.S. Pat. No. 4,307,773 discloses another type of process and apparatus in which a regenerator system based on bubbling fluidized bed layers is employed for heat recovery from contaminating gases. Besides the above-described patents, different types of regenerators are known based on alternate heating/cooling of granular material in separate, parallel, bubbling fluidized bed layers. UK patent 2,118,702 A discloses a regenerator based on downward dribbling fixed bed layers.

A central issue of regenerators based on a fixed heat transfer element and fixed layered zones of granular material is how to keep them clean. Also the need to prevent flows from mixing with each other causes sealing problems in these regenerators. Furthermore, the temperature differentials formed the heat transfer material impose mechanical stresses which limit the life of the heat transfer element or material. A drawback of the layered fixed bed regenerator is the channelling of flows in the fixed bed layers. Moreover, the fixed bed layers obviously develop inevitable temperature gradients in the direction of the flow and the temperature of a layer is difficult to control.

In fluidized bed reactors the flow velocities must be adapted according to the physical properties of the heat transfer material employed, and the control range of the regenerator is limited between the minimum fluidization velocity and the pneumatic transportation velocity. In practice this means that the heat transfer medium of the regenerator must have a coarse granular size, or alternatively, the flow velocities employed must be kept low. Furthermore, the recirculation of the heat transfer medium between the fluidized bed layers in a manner avoiding excessive mixing of the layers is problematic. This problem is accentuated at high pressure differentials between the heat-transferring flows. Herein, it is generally necessary to use mechanical valves whose wear and temperature limitations eliminate an essential portion of the benefits of this regenerator type. Prior-art fluidized-bed and fixed-bed regenerators require the use of a mechanical or pneumatic conveyor for recycling the heat transfer medium from the lower unit to the upper unit. In terms of equipment and process technology, such conveyors are almost impossible to implement. In fact the recycling system of the granular heat transfer medium is a characterizing property of the present regenerator invention.

SUMMARY OF THE INVENTION

The above-described drawbacks are overcome in a crucial manner by way of the method according to the invention wherein a regenerator according to the invention employs circulating fluidized bed reactors, rather than fixed-bed or fluidized bed reactors. More specifically, the method according to the present invention involves a regenerator comprising two or more parallel-connected circulating fluidized bed reactors, in each of which the flow participating in the heat transfer cycle is routed to the lower part of a chamber where the flow participating in the heat transfer cycle is contacted with the heat-transferring pulverized solids medium which enter the chamber both from an inlet channel of the external circulations of one or more circulating fluidized bed reactors of the regenerator and from an inlet channel of the internal circulation of said circulating fluidized bed reactor, and said solids medium is elevated along with flow participating in the heat transfer cycle through the chamber into a cyclone of the same circulating fluidized bed reactor, wherefrom the separated solids medium is routed to the upper end of the channel along which a portion of the solids flow is taken at a desired volume rate to the other circulating fluidized bed reactor of the regenerator and the rest of the solids flow separated in the cyclone is taken along the channel back to the lower part of the same circulating fluidized bed reactor and the flow participating in the heat transfer cycle, now freed from the solids medium particles, exits via a central pipe of the circulating fluidized bed reactor.

Figure 1:
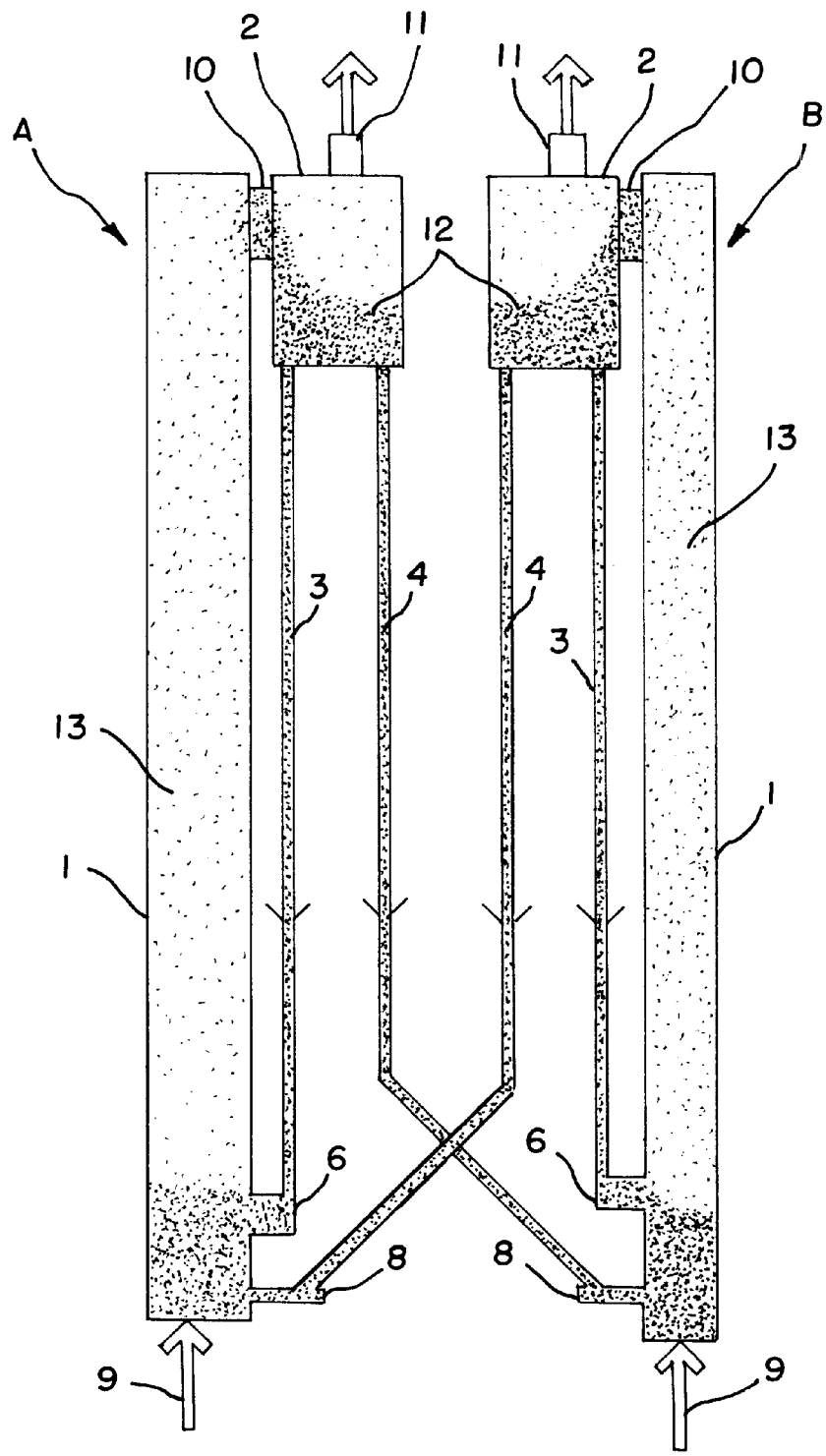
FIG. 1 shows the construction and fluid flows in a regenerator according to the present invention having two regenerators.

The chief benefits of the present invention over fixed-bed and fluidized-bed regenerators are listed as follows:

1. The flow and heat-transfer properties of the circulating fluidized bed technique are decisively better than in any prior-art regenerator type. With the help of an effective separator, a fine-grained heat transfer medium can be employed in circulating fluidized bed regenerators, simultaneously permitting the dimensioning of the equipment for high flow velocities.
2. Owing to the high flow velocity, regenerators based on the circulating fluidized bed technology are relatively small and have lower investment costs with respect to prior-art regenerators.
3. Regenerators based on the circulating fluidized bed technology operate over a significantly wider part-load range than conventional regenerators based on fixed-bed or fluidized-bed technology.
4. Circulating fluidized bed regenerators can employ media with heterogeneous physical properties, thus facilitating, for instance, simultaneous use of two or more heat transfer materials of different physical and/or chemical properties.
5. The medium mixing tendency in parallel reactors can be prevented in regenerators based on the circulating fluidized bed technology by way of a simple arrangement of the recycle channel of the circulating medium that additionally permits a rapid and accurate control of the regenerator.
6. Owing to the efficient mixing which is characteristic of the circulating fluidized bed technology, excellent temperature control of the reactors is attained, which has a decisive importance in the handling of contaminating flows.
7. The implementation of circulating fluidized bed reactors in the regenerator configuration avoids the use of separate mechanical or pneumatic conveyors for transferring the circulating medium from one regenerator unit to the other. By contrast, regenerators based on bubbling fluidized beds or dribbling fixed bed layers require high volume rates of the pneumatic carrier gas conveyors in relation to the process gas volume rates, thus making the use of such conveyors impossible in most cases.
8. The suspension density in the rising chambers of circulating fluidized bed regenerators can be easily controlled by complementing the external recycling loops of the circulating fluidized bed regenerators with a conventional internal recirculation of the solids.

In the following the invention is examined in greater detail with reference to the annexed drawing of FIG. 1.

FIG. 1 shows the basic construction of a regenerator according to the invention comprised of two circulating fluidized bed regenerators A and B, each comprised of a chamber 1, a cyclone 2 and a return channel 3, while the regenerators are connected as illustrated in FIG. 1. The flows participating in the heat transfer enter the regenerator via nozzles 9 and mix with the particles 13 recirculated in the circulating fluidized bed reactor in the lower part of chambers 1. Here, the temperature differentials between the flow and the recirculated particles is rapidly equalized and the flow in practice assumes the temperature of the isothermic chamber. The flow carries the particles upward through the chambers 1 into inlet channels 10 of cyclones 2, through which the suspended medium enters the cyclone chamber 2 tangentially. The particles are separated from the gas flow which next exits via a central pipe 11. The separated particles land on the bottom of the cyclone chamber 2, where the upper surfaces 12 are kept at a desired level. The levels of the surfaces 12 are determined so that the surface in one cyclone is adjusted to an accurately controlled level, while the surface level in the other cyclone varies within predetermined limits dictated by the amount of recirculated material and the running conditions. From the cyclones the recirculated material is routed into channels 3 and 4 as shown in FIG. 1. A portion of the recirculated material is directed via the channels 3 and a pneumatic valve 6 back to chamber 1. The internal recirculations of the reactors A and B can be used for controlling the amount of particles contained in the chambers 1, whereby in comparison to a situation without internal recirculations, a lower chamber can be employed, for instance. The internal recirculations can also be utilized to assure the cleanliness of the regenerator chambers at low volume rates of the recirculating material between the chambers. From the bottom part of the channel 4, a portion of the recirculating particles of reactor A are transferred via a pneumatic valve 8 to reactor B. The operation of the pneumatic valves 6 and 8 is based on the control of the supporting reactive force at the lower part of the fixed bed layers with the help of a gas flow of very low volume rate. When the supporting reactive force becomes smaller than the equilibrium limit force, the fixed bed commences gravitational fall downward. The benefits of the above-described operating principle over mechanical and pneumatic conveyors are, among others, a low wear rate and very low volume rate of required control flow. A column of recirculating particles in fixed-bed state is maintained in the channels 3 and 4, and the column is kept gravitationally moving downward. The fixed bed layers in channel 4 prevent the mixing of the flows A and B. Correspondingly, the fixed bed layers in channel 3 prevent the gas flow from entering the cyclone through an incorrect path, though operating conditions in the channels 3 can also be kept acceptable for the regenerator function without the benefit of the fixed-bed state. The situation and operation of reactor B is fully analogous. The heat transfer between the flows A and B is controlled by adjusting the particle flow rate between the reactors.

The above description elucidates only the basic configuration of the regenerator according to the invention, and for those versed in the art it is evident that the different embodiments of the invention can be varied within the scope and spirit of the described invention. For instance, the channel 4 can be advantageously tilted in some cases, thus permitting horizontal transfer of the particles, yet preventing in the above-described manner the flows from mixing with each other. If a pressure differential between the units of the regenerator configuration is very high, in some cases the channel 4 can be divided into several series-connected sections to avoid the regenerator height from becoming excessive. The configuration of two parallel connected reactors can be replaced by multiple parallel-connected reactors operating at different temperature levels, whereby their mutual gas and solids flows can be connected in varied ways. Obviously, such reactor units can also be operated in a series connection. Using chemically active heat transfer processes, desired kinds of chemical processes can be implemented. The described regenerator can also be employed for implementing a chemical or physical process, particularly when an accurate temperature control is crucial for running the process.

What is claimed is:

1. A regenerator comprising,
   a first and second circulating fluidized bed reactors having chambers with lower parts and upper parts, and heat-transferring pulverized solids medium therein;
   first and second cyclones connected each to said upper parts of said chambers of said first and second circulating fluidized bed reactors;
   a recirculating channel connecting a lower part of said first cyclone to said lower part of said chamber of said first circulating fluidized bed reactor;
   a first crossover channel connecting said lower part of said first cyclone to said lower part of said chamber of said second circulating fluidized bed reactor;
   a second crossover channel connecting a lower part of said second cyclone to said lower part of said chamber of said first circulating fluidized bed reactor;
   such that a first and second fluid flows are introduced to said lower parts of said chambers of said first and second circulating fluidized bed reactors and contacted with said heat-transferring pulverized solids medium therein.

2. The method defined in claim 1, wherein said heat-transferring pulverized solids medium moves downward during at least some portion of said introducing steps (D) and (E).

3. The method defined in claim 1, wherein said cyclone of said first circulating fluidized bed reactor contains a first amount of the heat-transferring pulverized solids medium, and wherein the first amount is adjusted by a constant level control, and said cyclone of the second circulating fluidized bed reactor contains a second amount of the heat-transferring pulverized solids medium, which second amount is permitted to vary according to the operating conditions and the amount of heat-transferring solids medium.

4. The method defined in claim 3, wherein said constant level control comprises a control valve between a crossover channel and the second circulating fluidized bed reactor.

5. The method defined in claim 4, wherein said constant level control further comprises a control valve between a recirculating channel and one of said first or second circulating fluidized bed reactors.

6. A regenerative method of transferring heat between a first fluid flow and a second fluid flow, comprising:
   (A) contacting said first and second fluid flows and a heat-transferring pulverized solids medium in lower parts of chambers of a first and second circulating fluidized bed reactors, each comprising cyclones, and conveying mixtures of said fluid flows and said heat-transferring pulverized solids medium from lower to upper parts of said chambers of said first and second circulating fluidized bed reactors;
   (B) removing a first of said mixtures from the upper part of said chamber of said first circulating fluidized bed reactor, and introducing said first mixture into the cyclone of said first circulating fluidized bed reactor;
   (C) separating said first fluid flow and said heat-transferring pulverized solids medium from said first mixture, and removing said first fluid flow from said cyclone of said first circulating fluidized bed reactor;
   (D) introducing portions of said separated heat-transferring pulverized solids medium from said cyclone of said first circulating fluidized bed reactor to said lower part of said chamber of said second circulating fluidized bed reactor which is connected in parallel to said first circulating fluidized bed reactor, and recycling a portion of said separated heat-transferring pulverized solids medium back to the lower part of said chamber of said first circulating fluidized bed reactor; and
   (E) introducing portions of said heat-transferring pulverized solids medium from said cyclone of said second circulating fluidized bed reactor to the lower part of said chamber of said first circulating fluidized bed reactor.

7. A regenerator comprising:
   a first reactor and a second reactor, both of a circulating fluidized bed type;
   said first reactor having a first chamber with a first inlet end and a first remote end, said first remote end having a first cyclone connected thereto, said first cyclone having a first outlet, said first chamber being capable of having a medium therein, the medium in the form of particalized, heat-transferring solids;
   said second reactor having a second chamber with a second inlet end and a second remote end, said second remote end having a second cyclone connected thereto, said second cyclone having a second outlet, said second chamber also being capable of having the medium therein;
   a first recirculating channel connecting said first cyclone to said first inlet end;
   a first crossover channel connecting said first cyclone to said second inlet end; and
   a second crossover channel connecting said second cyclone to said first inlet end;
   whereby when a first fluid flow is introduced into said first inlet end, substantially all the first fluid flow travels through the first chamber to an area near said first remote end, into the first cyclone, and out the first outlet.

8. The regenerator of claim 7, further comprising:
   a second recirculating channel connecting said second cyclone to said second inlet end.

9. The regenerator of claim 7, whereby when a second fluid flow is introduced into said second inlet end, substantially all the second fluid flow travels through the second chamber to an area near said second remote end, into the second cyclone, and out the second outlet.

10. The regenerator of claim 8, whereby when a second fluid flow is introduced into said second inlet end, substantially all the second fluid flow travels through the second chamber to an area near said second remote end, into the second cyclone, and out the second outlet.

11. The regenerator of claim 8, further comprising:
   a first recirculation valve in said first recirculating channel;
   a first crossover valve in said first crossover channel;
   a second recirculation valve in said second recirculating channel; and
   a second crossover valve in said second crossover channel.

12. The regenerator of claim 7, further comprising:
   a first crossover valve in said first crossover channel, wherein said first crossover valve may be actuated in order to control a flow rate of the medium from said first chamber to said second chamber.

13. The regenerator of claim 7, further comprising:
   a first crossover valve in said first crossover channel, wherein said first crossover valve may be actuated in order to control a flow rate of the medium from said first chamber to said second chamber; and
   a second crossover valve in said second crossover channel, wherein said second crossover valve may be actuated in order to control a flow rate of the medium from said second chamber to said first chamber.

14. The regenerator of claim 9, further comprising:
   a first crossover valve in said first crossover channel, wherein said first crossover valve may be actuated in order to control a flow rate of the medium from said first chamber to said second chamber; and
   a second crossover valve in said second crossover channel, wherein said second crossover valve may be actuated in order to control a flow rate of the medium from said second chamber to said first chamber, whereby a medium flow rate of the medium between said first chamber and said second chamber, and between said second and said first chamber, may be controlled regardless of a difference in a fluid flow rate between the first fluid flow and the second fluid flow.

15. The regenerator of claim 10, further comprising:
   a first crossover valve in said first crossover channel, wherein said first crossover valve may be actuated in order to control a flow rate of the medium from said first chamber to said second chamber; and
   a second crossover valve in said second crossover channel, wherein said second crossover valve may be actuated in order to control a flow rate of the medium from said second chamber to said first chamber, whereby a medium flow rate of the medium between said first chamber and said second chamber, and between said second and said first chamber, may be controlled regardless of a difference in a fluid flow rate between the first fluid flow and the second fluid flow.

* * * * *

UNITED STATES PATENT AND TRADEMARK OFFICE
CERTIFICATE OF CORRECTION

PATENT NO.   : 6,276,441 B1
DATED        : August 21, 2001
INVENTOR(S)  : Seppo Ruottu It is certified that error appears in the above-identified patent and that said Letters Patent is hereby corrected as shown below:

<u>Title page,</u>
Item [63], Related U.S. Application Data, please correct the filing date of applicaton No. PCT/FI93/00387 to read -- September 24, 1993 -- as set out below:

Related U.S. Application Data
[63]   Continuation of application No. 08/381,959, filed as applicaton
       No. PCT/FI93/00387 on September 24, 1993, now abandoned.

Signed and Sealed this

Second Day of July, 2002

*Attest:*

*Attesting Officer*

JAMES E. ROGAN
*Director of the United States Patent and Trademark Office*